United States Patent [19]

Witte

[11] Patent Number: 5,248,004

[45] Date of Patent: * Sep. 28, 1993

[54] ADJUSTABLE PIPE JOINT

[75] Inventor: Johannes Witte, Braunschweig, Fed. Rep. of Germany

[73] Assignee: Baker Hughes Incorporated, Houston, Tex.

[ * ] Notice: The portion of the term of this patent subsequent to Apr. 7, 2009 has been disclaimed.

[21] Appl. No.: 862,391

[22] Filed: Apr. 2, 1992

Related U.S. Application Data

[63] Continuation-in-part of Ser. No. 608,192, Nov. 1, 1990, Pat. No. 5,101,915.

[30] Foreign Application Priority Data

Nov. 2, 1989 [DE] Fed. Rep. of Germany ....... 3936362

[51] Int. Cl.⁵ ...................... E21B 7/08; E21B 17/042; E21B 17/046; F16L 15/00
[52] U.S. Cl. ................... 175/74; 175/325.2; 175/325.5; 285/175; 285/184; 285/330
[58] Field of Search ....................... 175/73, 74, 75, 61, 175/62, 320, 325.2, 325.1, 325.5; 285/184, 175, 330; 166/241.6

[56] References Cited

U.S. PATENT DOCUMENTS

| | | | |
|---|---|---|---|
| 1,855,363 | 4/1932 | Peterson | 403/27 |
| 3,701,550 | 10/1972 | Jacobson | 285/330 X |
| 4,067,404 | 1/1978 | Crase | 175/75 |
| 4,304,428 | 12/1981 | Grigorian et al. | 285/333 |
| 4,397,484 | 8/1983 | Miller | 285/81 |
| 4,507,842 | 4/1985 | Werner | 29/451 |
| 4,522,272 | 6/1985 | Beimgraben | 175/74 |
| 4,553,614 | 11/1985 | Jurgens et al. | 175/302 |
| 4,560,013 | 12/1985 | Beimgraben | 175/73 |
| 4,577,701 | 3/1986 | Dellinger et al. | 175/61 |
| 4,596,294 | 6/1986 | Russell | 175/74 |
| 4,610,307 | 9/1986 | Jurgens et al. | 175/320 |
| 4,694,914 | 9/1987 | Obrecht | 175/61 |
| 4,739,842 | 4/1988 | Kruger et al. | 175/61 |
| 4,813,497 | 3/1989 | Wenzel | 175/74 |
| 4,817,740 | 4/1989 | Beimgraben | 175/74 |
| 4,854,613 | 8/1989 | Reece et al. | 285/175 X |
| 5,094,305 | 3/1992 | Wenzel | 175/74 |
| 5,101,915 | 4/1992 | Witte | 175/74 |

FOREIGN PATENT DOCUMENTS 1229945 11/1963 Fed. Rep. of Germany .

Primary Examiner—Stephen J. Novosad
Attorney, Agent, or Firm—Michael Polacek

[57] ABSTRACT

The present invention discloses a universal, adjustable pipe joint which permits a wide variety of possible adjustments with simple means in well drilling technology. In principle, the joint disclosed in this invention can be readily used for joining articles of all types which included tubular, pipe-like, projections.

21 Claims, 10 Drawing Sheets

ADJUSTABLE PIPE JOINT

This is a continuation-in-part of patent application Ser. No. 07/608,292 filed on Nov. 1, 1991, now issued as U.S. Pat. No. 5,101,915.

BACKGROUND OF THE INVENTION

The present invention discloses a novel adjustable tool joint of two pipe sections that form part of a drill string casing, for example, a deep drilling tool casing for a directional drilling motor.

A known pipe joint of this type, as disclosed in U.S. Pat. No. 4,813,497, serves to impart a neutral axial alignment to the pipe sections that are to be joined and this alignment can be varied within a given bending angle range. This pipe joint consists of a total of five components and includes a tubular inside part that can be screwed in at one end and which also has an outside thread coinciding with the inside thread of one of the pipe sections to which it is to be joined. The outside thread of this inside part has a thread axis which forms an angle with the main axis of the inside equal to half the size of the maximum possible bending angle for the pipe joint.

A tubular connecting part is provided on the inside part so that the connecting part can move axially over and rotate above the main axis of the inside part. This tubular connecting part has an outside thread on one end that can be screwed with the inside thread of the other pipe section to be joined. This outside thread has a thread axis which also forms an acute angle with the main axis of the inside part and which corresponds to half the size of the maximum possible bend angle of the pipe joint. The connecting part also has facing teeth on the end facing away from its outside threads, and by means of these teeth it engages with the facing teeth on a tubular outside part which can move axially over the inside part but which is prevented from turning about the main axis of the inside part.

The outside part and the connecting part are held in mutual engagement by two nuts, each of which sits with its outside thread on the inside part in a screwed engagement, and the parts are held in compressive engagement on their facing ends with the other ends of the outside part and the connecting part facing away from each other. Be releasing the compressive engagement between the outside part and the nut engaged with it, the outside part can be moved with the connecting part and the connecting part can be turned to the desired extent relative to and about the main axis of the inside part. The locking engagement between the outside part and the connecting part can be restored and secured b tightening the nut acting on the outside part.

Depending on the alignment of the connecting part relative to the inside part, a bend angle can be adjusted between the axes of the pipe sections to be connected with this pipe joint. This bend angle has a range whose minimum value is zero and whose maximum value is based on the sum of the angles about which the hinge axes of the connecting thread for the pipe sections to be joined are bent from the main axis of the inside part of the pipe joint.

Such a pipe joint is complicated in its design and handling, has a reduced strength in comparison with the strength of the joined pipe sections, permits angle changes only in the stages determined by the facing teeth between the outside part and the connecting part, and does not present a closed exterior contour in the area of the joint.

In another known pipe joint design including an adjustable angle of bend between the pipe sections to be joined, as disclosed in U.S. Pat. No. 4,817,740, two pipe bodies which are part of the pipe joint are connected directly to each other by way of threads whose axes are bent at an angle. The bend angle between the pipe sections of the drill casing to be joined changes with the length of engagement of the angled threads of the two bodies that are to be screwed together. The engagement length is determined by spacers placed between the two pipe bodies.

Such a design is also complicated structurally and in its field handling, permits only stepwise adjustments in the bend angle between the pipe sections to be joined as a function of the gradation in the available spacers, and causes an adjustment in the axial distance between the pipe sections to be joined when the angle of the bend is adjusted.

There is also a known pipe joint where the pipe sections of a drill casing are joined together with a screw connection, as disclosed in U.S. Pat. No. 4,553,614, whereby a spacer is provided and can be inserted between the facing ends of the pipe sections to be joined. The spacers consists of segments that can be joined to form a ring between the end faces of the pipe sections be joined. Such a pipe joint makes it possible to adjust the mutual spacing of the pipe sections to be joined without detaching the mutual screw connection of the pipe sections. Such a spacing adjustment makes it possible, for example, to vary the pre-tension of an axial spring arranged between the shoulders of the pipe sections that are to be connected, but it is also associated with changes in the rotatory alignment of the pipe sections to be joined.

SUMMARY OF THE INVENTION

The present invention discloses an especially simple design of an adjustable angle pipe joint that assures a closed transition between the pipe sections joined and offers various possibilities for mutual arrangement of the joined pipe sections.

The pipe joint according to the present invention consists of a few simple parts which permit both rapid and simple changes in arrangement. The pipe joint disclosed herein provides great joint strength so that the drill string casing is not weakened in the area of the pipe joint in comparison with a conventional thread joint. The pipe joint also requires only minor structural variations to implement different possible angle and part arrangements.

More particularly, the present invention discloses a universal, adjustable pipe joint which permits a wide variety of possible adjustments with simple means in well drilling technology. In principle, the joint disclosed in this invention can be readily used for joining articles of all types which include tubular, pipe-like, projections.

DETAILED DESCRIPTION OF THE INVENTION

Figure 1:
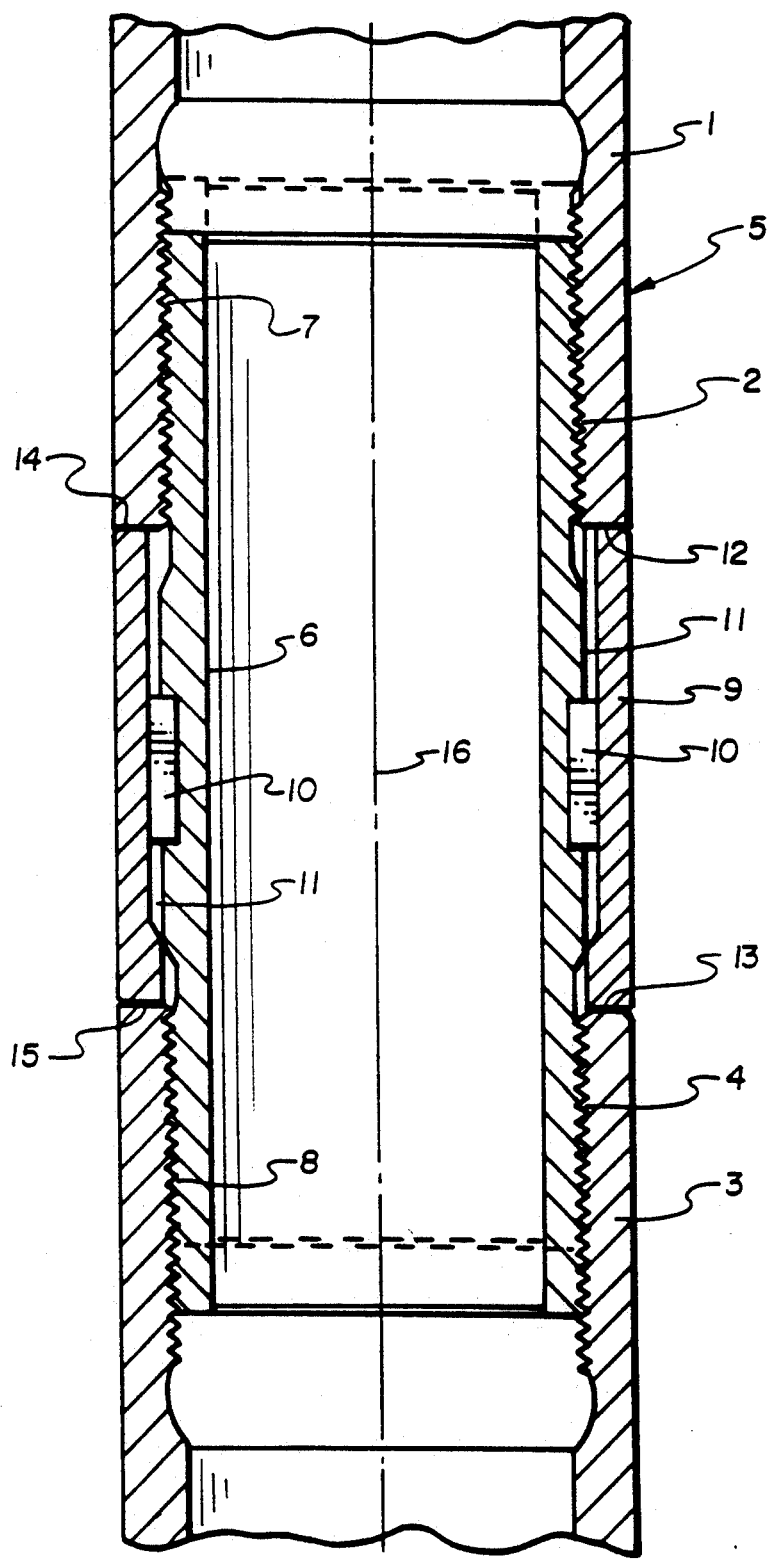
FIG. 1 shows a cutaway longitudinal section through an area of a drill string casing to illustrate one embodiment of a pipe joint according to the present invention.

The present invention will now be described in greater detail and with specific reference to the accompanying drawings. With reference now to FIG. 1, one embodiment of the present invention is shown.

FIG. 1 shows a cutaway diagram illustrating a first pipe section 1 including an inside thread 2 on the end facing a second pipe section 3. The latter is also provided with an inside thread 4 on the end facing the first pipe section 1.

These two pipe sections 1 and 3 that are to be joined are generally part of a drill string casing 5 and within it they may form the parts of an outer casing for a tool, e.g., for a motor for directional drilling, or part of the drill string pipe itself. However, pipe sections 1 and 3 may also be part of a separate pipe joining device and may be provided with a connecting thread of a suitable type and design on the ends facing away from the inside threads 2 and 4. In general, this is also true of the other embodiments illustrated in FIGS. 2–10.

The pipe joint in FIG. 1 includes a tubular inside part 6 which is provided with outside threads 7 and 8 on each of its two ends. The two inside threads 2 and 4 of the two pipe sections 1 and 3 are screwed to the outside threads 7 and 8. The inside threads 2 and 4 of the pipe sections 1 and 3 are designed as cylindrical threads and have a length greater than the length required for an engagement that will assure a secure joint. This is also true of outside threads 7 and 8, likewise cylindrical, of the inside part 6. Accordingly, threads 2 and 7 and 4 and 8, respectively, form adjusting thread pairs whose depth of engagement is variable and which run in the same direction of rotation.

The pipe joining arrangement also includes a tubular outside part 9 which can move over inside part 6 but which is non twistably supported on inside part 6. For example, the axially moveable support, which is also twistproof, can be implemented by a multispline profile, by splines 10 that fit into grooves 11, or by some other suitable guidance and securing devices.

Outside part 9 includes end faces 12 and 13 which are in compressive engagement with end faces 14 and 15, respectively, on the connecting ends of pipe sections 1 and 3 when these sections are in the joining/locking position. In the design shown in FIG. 1, all of the end faces 12, 13, 14, and 15 are flat annular faces arranged in a plane running at right angles to the longitudinal middle axis 16 of the inside part 6. Furthermore, annular faces 12 and 13 of the outside part 9 have inside and outside diameters that essentially correspond to the inside and outside diameters of annular faces 14 and 15 on the pipe sections that are to be joined so that the respective end faces 12 and 14 and 13 and 15 are essentially flush with each other and are in mutual compressive engagement over their entire areas when the pipe sections are joined.

If the pitch of the threads in the thread pairs 2 and 7 and 4 and 8 is identical, as shown in FIG.1, the inside part 6 can be axially adjusted relative to the first or second pipe section 1 or 3 as illustrated by the position of inside part 6 as shown with a dotted line. This adjustment makes it possible, for example, to alter the axial bias of an axial spring package that is supported on one of the end faces of the inside part 6 or on an abutment supported by the inside part 6 on one end and on the other end being supported on an abutment face belonging to the first or second pipe section 1 or 3. Furthermore, the axial adjustment of the inside part 6 relative to the pipe sections 1 and 3 can also be used to vary the rotatory alignment of the inside part 6 relative to the pipe sections 1 and 3, e.g., in order to vary the bias of a torsion spring held between the inside part 6 and one of the pipe sections 1 or 3.

In all settings, the drill casing 5 can have a smooth continuous outside contour in the area of the joint of pipe sections 1 and 3, and, in the case of a flush alignment of pipe sections 1 and 3, the drill casing 5 also has a cylindrical outer contour when, as shown here, the outside diameter of outside part 9 corresponds to the outside diameter of pipe sections 1 and 3.

Figure 6:
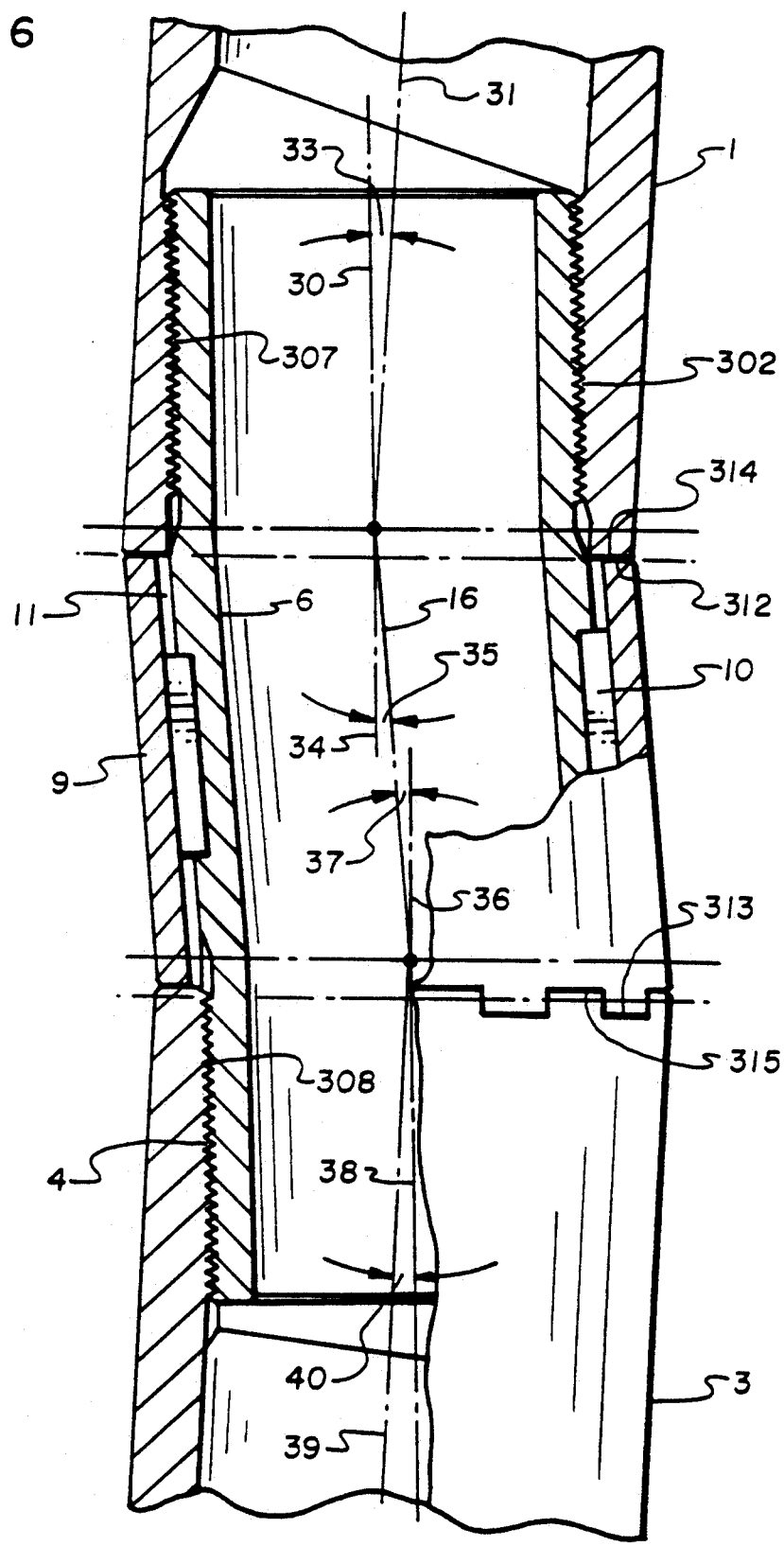
FIG. 6 shows a cutaway longitudinal section through an area of a drill string casing to illustrate yet a further embodiment of a pipe joint according to the present invention.
Figure 7:
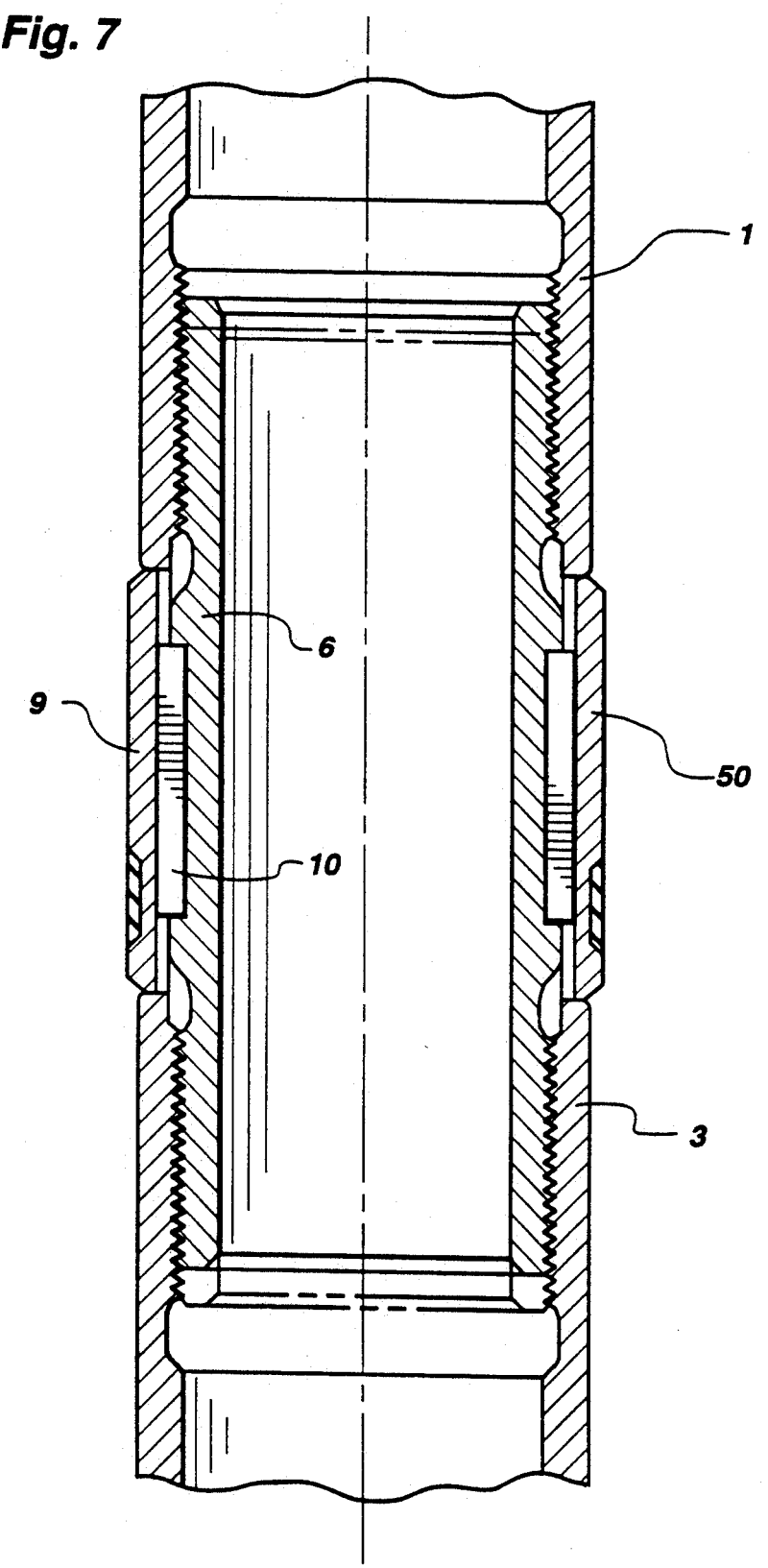
FIG. 7 shows a pipe joint according to the present invention which includes a stabilizer.
Figure 8:
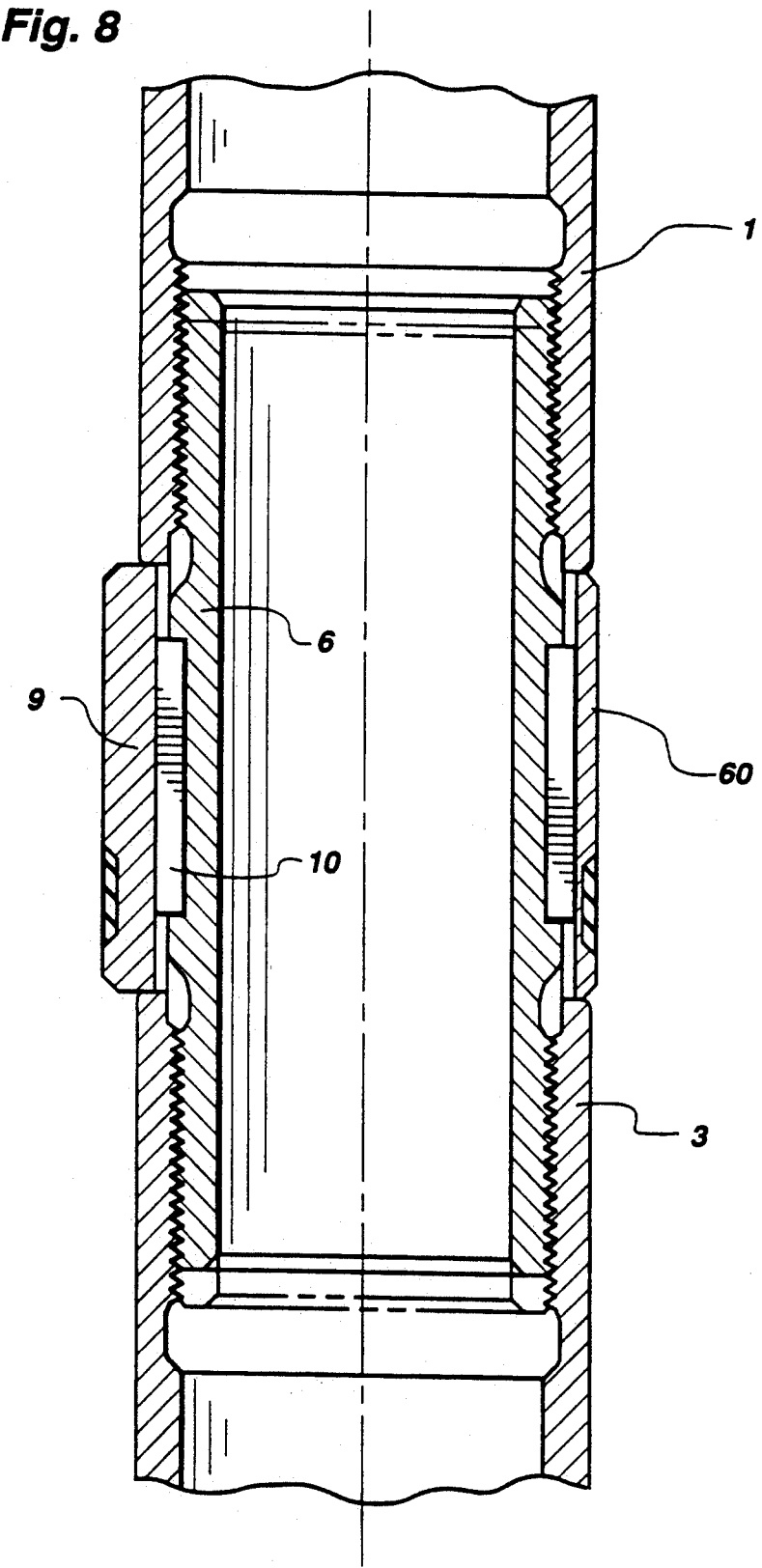
FIG. 8 shows a pipe joint according to the present invention which includes an eccentric stabilizer.
Figure 9:
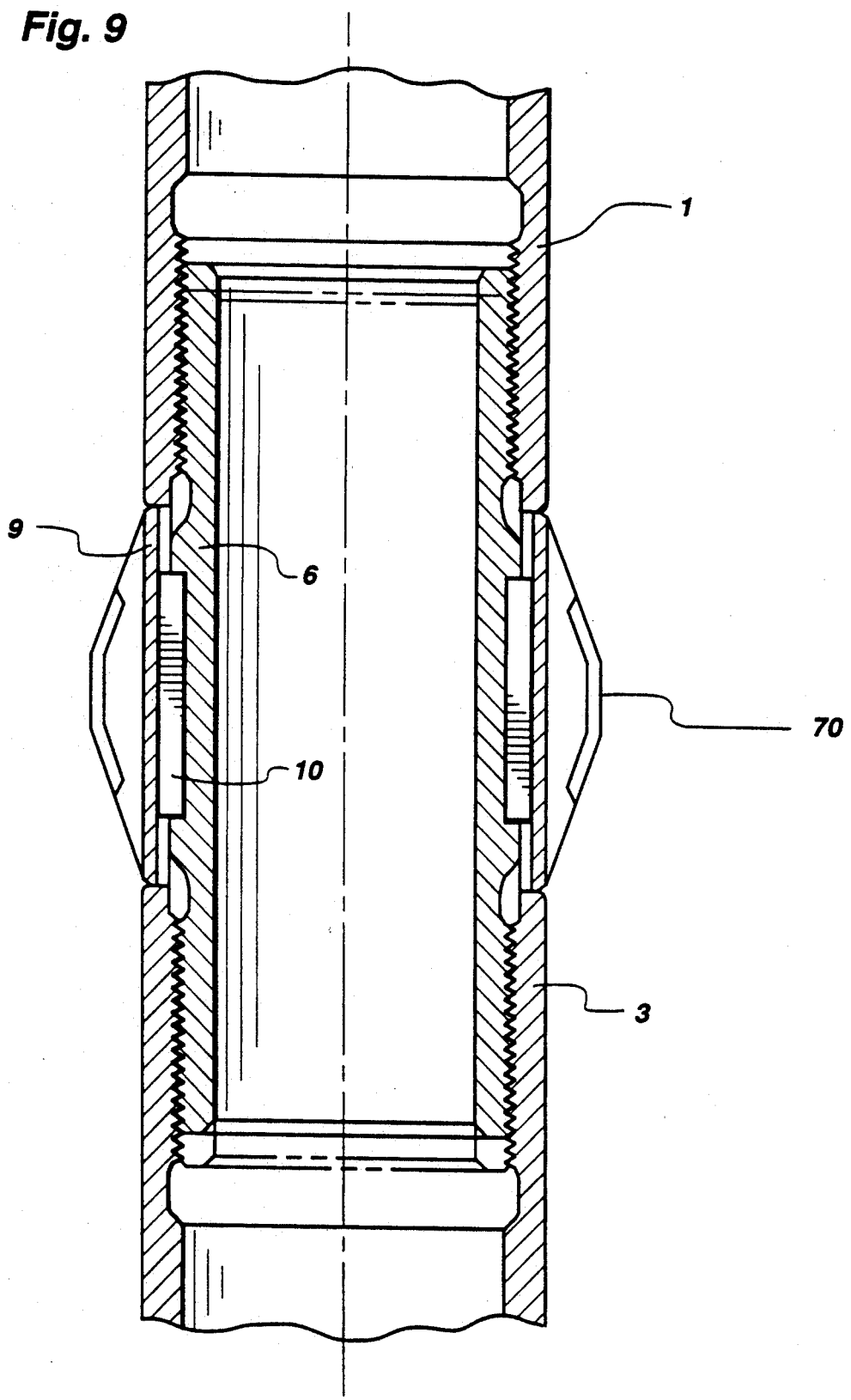
FIG. 9 shows a pipe joint according to the present invention which includes a wear protection sleeve.
Figure 10:
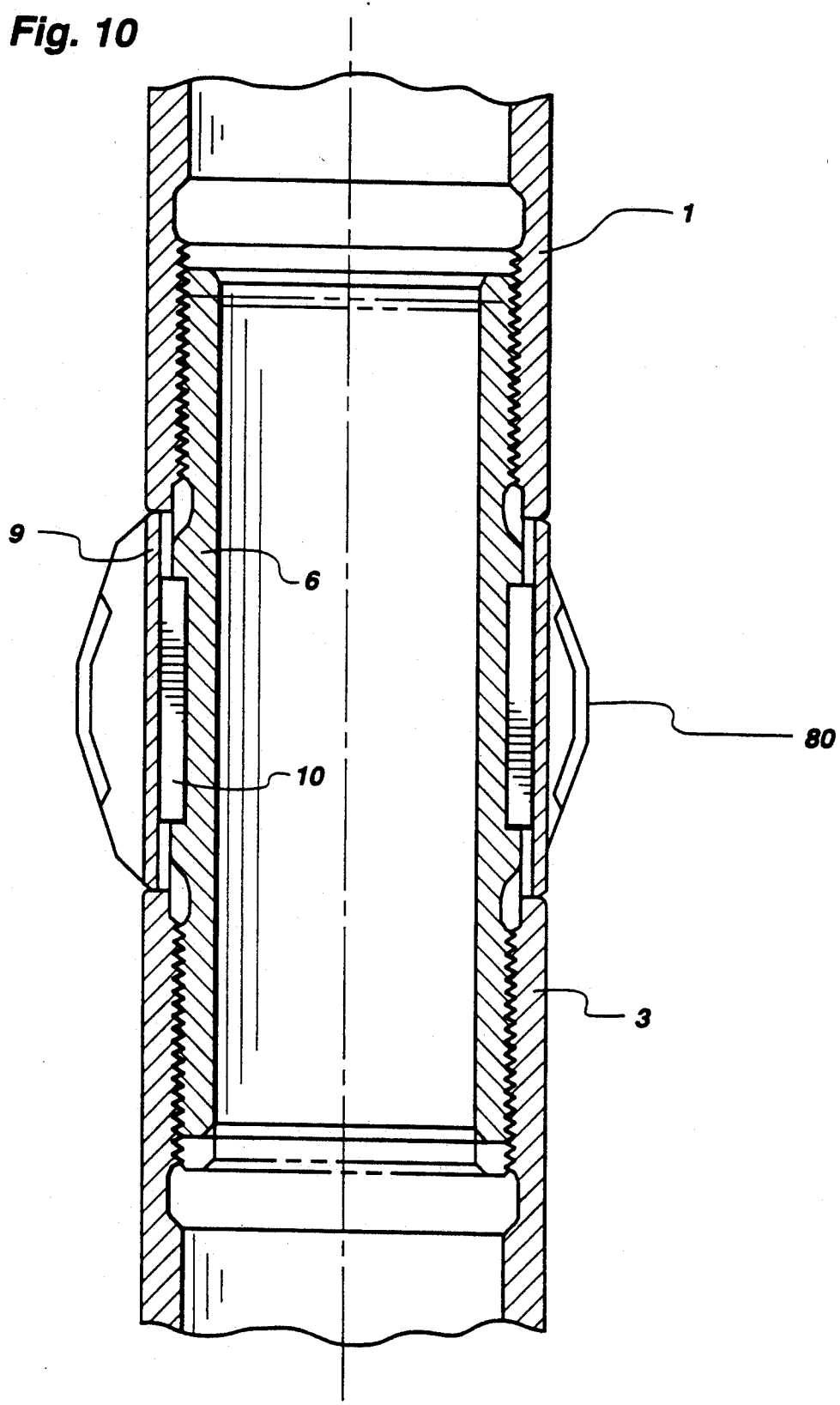
FIG. 10 shows a pipe joint according to the present invention which includes an eccentric wear protection sleeve.

Furthermore, and as shown in FIGS. 7 and 8, since rotatory adjustment of the inside part 6 relative to pipe sections 1 and 3 is also associated with a rotatory adjustment of the alignment of outside part 9 relative to pipe sections 1 and 3, the pipe joint according to this invention also makes it possible, for example, to use the outside part 9 as a tool or as a carrier for a tool, e.g., a stabilizer 50 or an eccentric stabilizer 60 that can be easily exchanged for a different stabilizer with a different diameter and/or a different eccentricity. As indicated in FIGS. 9 and 10, the outside part 9 could also comprise such tools as a wear-protection sleeve 70 or an eccentric wear-protection sleeve 80. Other tools could also include a ribbed stabilizer or an eccentric and ribbed stabilizer; etc.; all of which could have an enlarged outside diameter with respect to the outside diameters of the two pipe sections, 1 and 3, to be joined. The specific nature and design of such tools is well known in the art and the alignment of such a tool could be varied by the adjustment of outside part 9 relative to pipe sections 1 and 3. Of course, any such tools could be used with any of the pipe joint embodiments discussed herein and shown in the accompanying FIGS. 1–6.

To make an adjustment in the embodiment shown in FIG. 1, the engagement between either section 1 and part 9 or section 3 and part 9 is released with the help of torque generators acting on the outside part 9 and on the respective pipe section 1 or 3. Then the desired rotatory or axial adjustment of inside part 6 together with outside part 9 relative to pipe section 1 or 3 is performed. Furthermore, while maintaining the alignment of either section 1 and part 6 or section 3 and part 6 relative to each other, the joint position of the sections is restored by rescrewing pipe section 1 or 3, in comparison with which a change in alignment of inside and outside parts 6 and 9 is of no relevance.

When outside part 9, for whatever reason, has such a small axial dimension that a torque-producing tool cannot be attached to it, the end faces of a pair, 12 and 14 or 13 and 15, of end faces may either have an increased coefficient of friction or may be provided with grooves or teeth, e.g., as illustrated in FIG. 6, in order to permit the desired engagement or disengagement of the other pair of end faces. For adjustment purposes in such a case, all that is necessary is to release a coupling located near the facing teeth, for example between outside part 9 and one of the pipe sections 1 or 3, in order to be able to adjust the inside part 6 relative to the outside part 9 and thus relative to the other pipe section.

The various pipe joint embodiments as discussed elsewhere herein could also be made with thread connection pairs 2 and 7 and 4 and 8 running in opposite directions of rotation. This arrangement could be used in cases where a safe connection is to be made up between two connecting pipe sections 1 and 3 without the necessity of rotating either section 1 or 3 once both outside threads 7 and 8 of inside part 6 are engaged with the inside threads 2 and 4 of the two pipe sections 1 and 3, respectively. The connection between pipes section 1 and 3 could then be easily tightened by only rotating outside part 9 and inside part 6 while pipe sections 1 and 3 are held generally non-rotatable.

Figure 2:
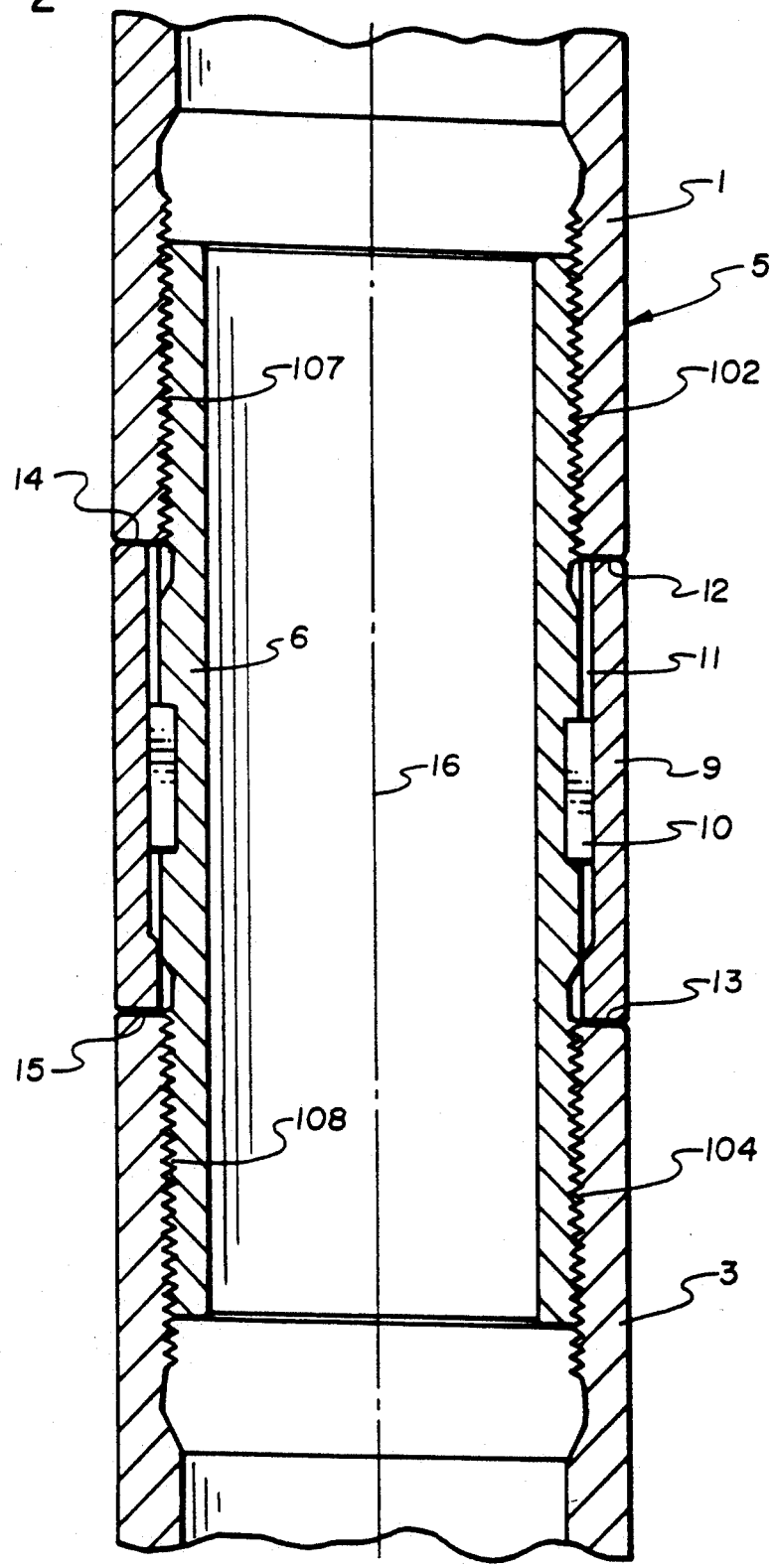
FIG. 2 shows a cutaway longitudinal section through an area of a drill string casing to illustrate another embodiment of a pipe joint according to the present invention.

A second embodiment, as shown in FIG. 2, of a pipe joint according to this invention corresponds to that embodiment shown in FIG. 1 and discussed hereinabove with the difference that the respective pitches of the pairs of threads 102 and 107 and 104 and 108, threads 102 and 104 being the inside threads of pipe sections 1 and 3 respectively and threads 107 and 108 being the outside threads of inside part 6, differ from each other. In addition to the adjustment options of the version according to FIG. 1, the embodiment shown in FIG. 2 also provides for the possibility of varying the rotatory alignment of pipe section 1 relative to pipe section 3 by axially adjusting the inside part 6 relative to pipe sections 1 and 3. In this way, for example, the bias of a torsion spring supported between pipe sections 1 and 3 can be varied or the alignment of an eccentric stabilizer arranged on one the two pipe sections 1 or 3 may be changed.

In both versions, as shown in FIGS. 1 and 2, inside threads 2 and 4 and 102 and 104 of pipe sections 1 and 3 respectively, have thread axes that coincide with the longitudinal middle axis of their respective pipe section 1 or 3. Likewise, the thread axes of outside threads 7 and 8 and 107 and 108 coincide with the longitudinal middle axis 16 of inside part 6 and thus also with the longitudinal middle axes of pipe sections 1 and 3. It becomes clear that the pipe joint shown in FIGS. 1 and 2 offers no possibility of forming a variable angle of bend between the pipe sections 1 and 3. However, this possibility does exist in the embodiments shown in FIGS. 3–6 which will be discussed in greater detail hereinbelow.

Figure 3:
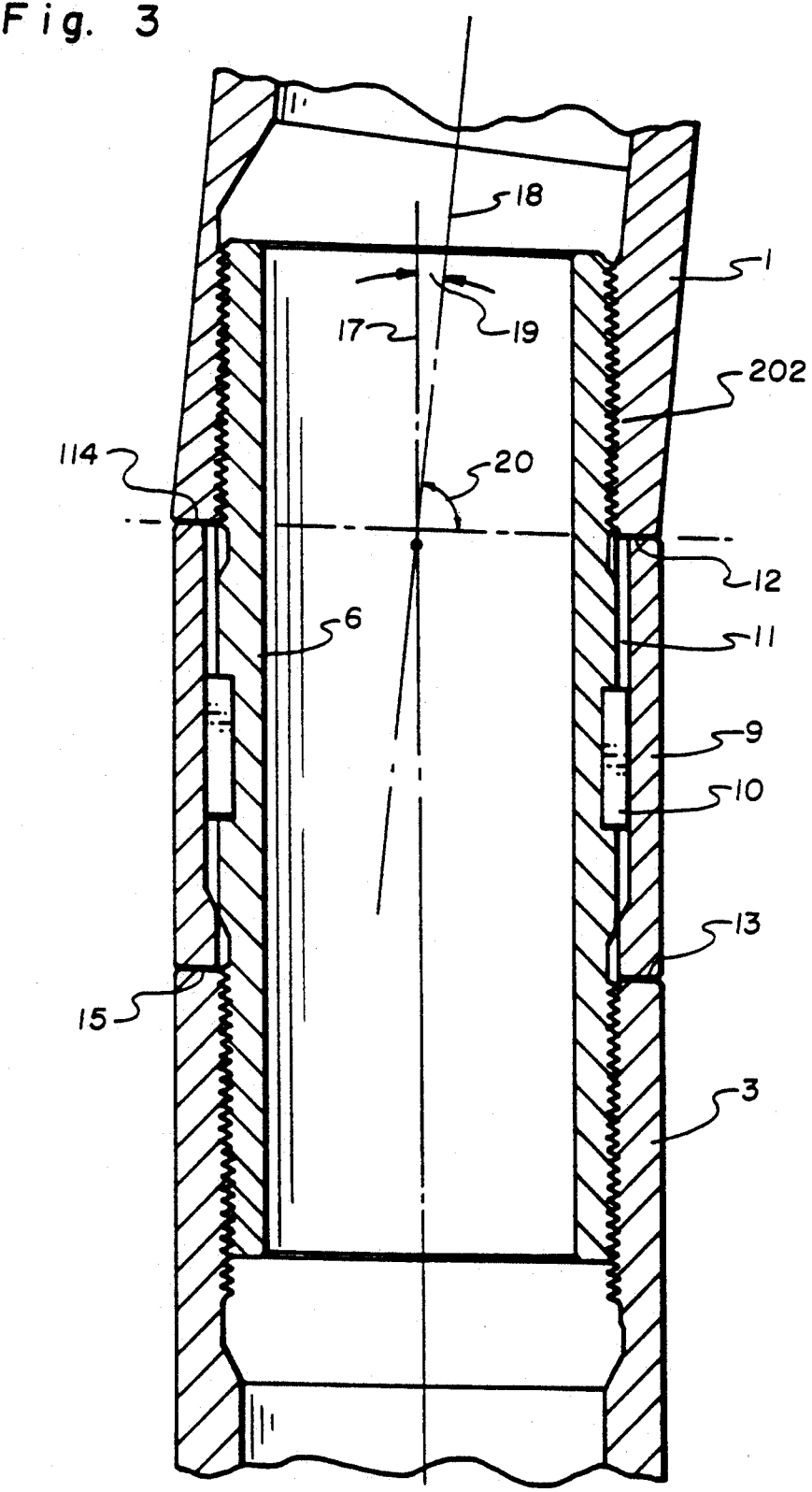
FIG. 3 shows a cutaway longitudinal section through an area of a drill string casing to illustrate yet another embodiment of a pipe joint according to the present invention.

The embodiment shown in FIG. 3 differs from those shown in FIGS. 1 and 2 in that the inside thread of one of the pipe sections 1 or 3, the inside thread 202 of pipe section 1 in the example shown here, has a thread axis 17 which, together with the longitudinal middle axis 18 of its pipe section 1, forms an acute angle 19. Such a pipe joint creates a tube body known, for example, as a "bent sub" as used for directional drilling work. Nevertheless, all of the adjustments discussed with regard to the embodiments shown in FIGS. 1 and 2 are also possible in the embodiment shown in FIG. 3. The possibility of a rotation adjustment of pipe section 1 relative to pipe section 3 is especially important in cases where pipe section 3 includes a bend and an alignment of the bend between pipe section 1 and pipe section 3 relative to the bend of pipe section 3 is desired.

It should also be pointed out that the end face 114 of pipe section 1, as shown in FIG. 3, is in a plane which, together with the longitudinal middle axis 18 of pipe section 1, forms an angle 20 that differs from 90° and the amount of that angle's deviation from 90° corresponds to the size of angle 19. This assures that end faces 12 and 114 are aligned parallel to each other and at right angles to thread axis 17 and that a closed outer contour is preserved even in the area of the bend.

Figure 4:
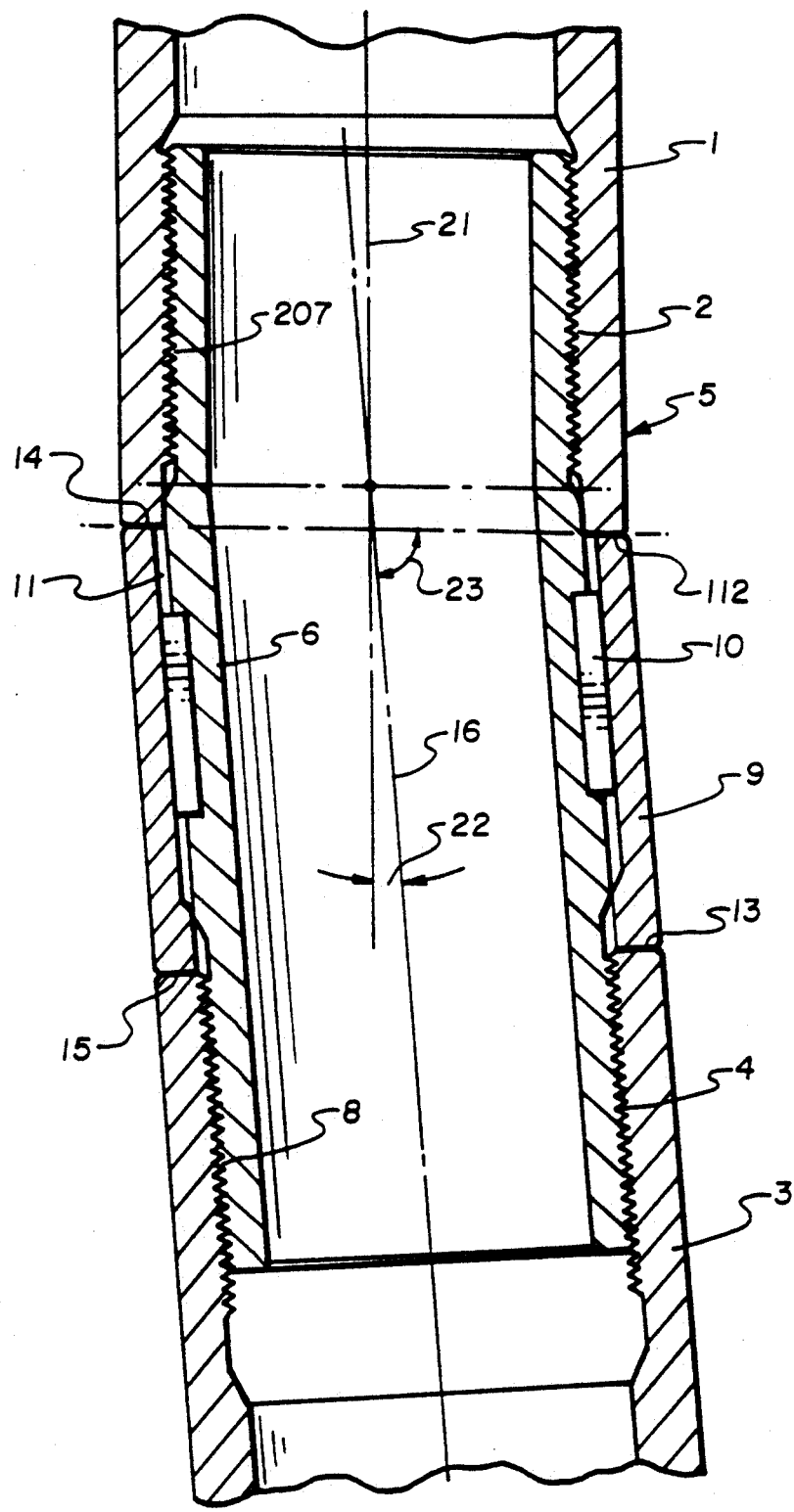
FIG. 4 shows a cutaway longitudinal section through an area of a drill string casing to illustrate a further embodiment of a pipe joint according to the present invention.

The embodiment shown in FIG. 4 differs from those shown in FIGS. 1 and 2 in that an outside thread of inside part 6, outside thread 207 in the example shown here, has a thread axis 21 which, together with the longitudinal middle axis 16 of inside part 6, forms an angle 22. This version offers similar possibilities for adjustment as those obtained with the version shown in FIG. 3, but in a pipe joint for pipe sections 1 and 3 which includes coaxial thread axes of the two inside threads 2 and 4 relative to the longitudinal middle axes of their respective pipe sections 1 and 3.

Another difference between the embodiment shown in FIG. 4 and those shown in FIGS. 1 and 2 is that the end face 112 of outside part 9 is in a plane which forms an angle 23 with the longitudinal middle axis 16 of inside part 6 where said angle differs from 90° by an amount corresponding to size of angle 22. Thus, this version also incorporates the closed outside contour in the area of the bend because end faces 14 and 112 are aligned so that they are parallel to each other.

In addition to the possible adjustments obtained with the embodiment shown in FIG. 3, there is also a possibility of varying the angle of bend between pipe sections 1 and 3 in the embodiment shown in FIG. 4 by replacing inside part 6 and outside part 9 with similar parts whose angles 22 and 23 differ from those shown in the present example.

Figure 5:
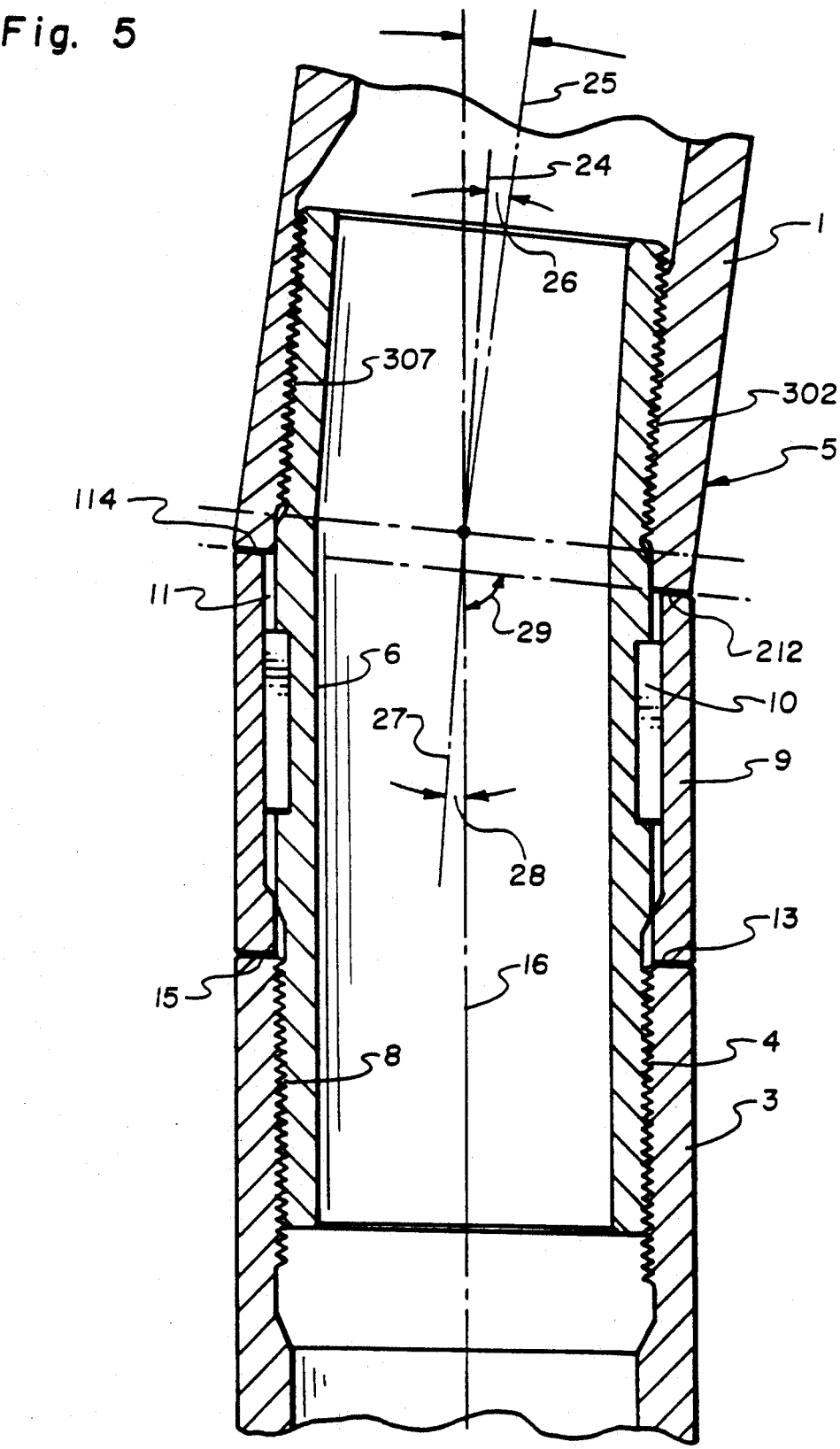
FIG. 5 shows a cutaway longitudinal section through an area of a drill string casing to illustrate still another embodiment of a pipe joint according to the present invention.

The embodiment shown in FIG. 5 differs from those shown in FIGS. 1 and 2 in that the middle axis of the inside thread of a pipe section 1 or 3, thread axis 24 of inside thread 302 of pipe section 1 in the example shown here, forms an acute angle 26 with the longitudinal middle axis 25. This is similar in form to the embodiment shown in FIG. 3. As shown in FIG. 5, the alignment of the end face 114 is at right angles to the longitudinal middle axis 24 of inside thread 203.

Another difference is that the thread axis 27 of outside thread 307 of inside part 6, which coincides with thread axis 24 in FIG. 5, forms an acute angle 28 with the longitudinal middle axis 16 of inside part 6 and the size of this angle may correspond to or differ from the size of the angle 26. End face 212 on outside part 9 runs in a plane which, together with the longitudinal middle axis 16 of inside part 6, forms an angle 29 that differs from 90° and the size of that angle's deviation from 90° corresponds to the size of angle 28. Thus, a closed outside contour in the area of the bend is also assured in this version by the parallel arrangement of end faces 114 and 212.

In the embodiment shown in FIG. 5, a continuously adjustable angle of bend can be formed between pipe sections 1 and 3 and the possible adjustments cover an angle range whose upper limit value is defined by the sum of angles 26 and 28 and it lower limit is defined by the difference between angles 26 and 28. This range includes an angle of bend of 0° in the case when angles 26 and 28 are equal in size. Such a continuous adjustment of the angle of bend is independent of particular spacing measures and is also free of variations in distance between pipe sections 1 and 3.

The embodiment shown in FIG. 6 differs from those shown in FIGS. 1 and 2 in that the thread axis 30 of inside thread 302 of pipe section 1 forms an acute angle 33 with its longitudinal middle axis 31, thread axis 34 of outside thread 307, which coincides with thread axis 30, forms an acute angle 35 with the longitudinal middle axis 16 of inside part 6, thread axis 36 of outside thread 308 of inside thread part 6 forms an acute angle 37 with its longitudinal middle axis 16, and thread axis 38 of pipe section 3, which coincides with thread axis 36, forms an acute angle 40 with its longitudinal middle axis 39. End faces 312 and 314 are parallel to each other and aligned at right angles to the longitudinal middle axes 34 and 30, and end faces 313 and 315 of part 6 and section 3, which form part of the facing teeth, run in planes parallel to each other and forming an angle of 90° with the longitudinal middle axes 36 and 38

Such a design makes it possible to achieve a variable axial offset between the longitudinal middle axes 31 and 39 of pipe sections 1 and 3 with identical angles 33, 35, 37, and 40. An angle of bend between pipe sections 1 and 3 can also be implemented where the maximum value corresponds to the sum of the angles 33, 35, 37, and 40. In this way, a relatively great total angle of bend ca be achieved with relatively small bends in the thread axes.

Furthermore, there is also the possibility of creating a variable double bend piece with different sizes of angles. For example, angles 33 and 35 are made identical to each other and angles 37 and 40 are also made identical to each other so that the resulting angle of bend is between the first pipe section 1 and the second pipe section 3, but at the same time the intermediate range between the ends of pipe sections 1 and 3 formed by outside part 9 has an opposite bend. Such a design is especially important for and useful in navigational drilling tools.

In the foregoing specification, this invention has been described with reference to specific exemplary embodiments thereof. It will, however, be evident that various modifications and changes may be made thereunto without departing from the broader spirit and scope of the invention as set forth in the appended claims. The specification and drawings included herein are, accordingly, to be regarded in an illustrative rather than in a restrictive sense.

What is claimed is:

1. A pipe joint for a first and second pipe section, said pipe sections forming part of a drill string casing and including opposing end faces and an inside thread on their facing ends, said pipe joint comprising a tubular inside part which has an outside thread on each of its opposite ends wherein the outside threads run in the same direction of rotation, one of said ends being screwed to the inside thread of the first pipe section and the other of said ends being screwed to the inside thread of the second pipe section, and a tubular outside part comprising a tool and including opposite end faces that can move axially over said inside part, and which is non-twistably supported on said inside part, so that when the pipe sections are in a joined position, the opposing end faces of the pipe sections are in a compressive engagement with the opposite end faces of the outside part.

2. A pipe joint according to claim 1, wherein said tool comprises a stabilizer.

3. A pipe joint according to claim 1, wherein said tool comprises an eccentric stabilizer.

4. A pipe joint according to claim 1, wherein said tool comprises a wear protection sleeve.

5. A pipe joint according to claim 1, wherein said tool comprises an eccentric wear protection sleeve.

6. A pipe joint for a first and second pipe section, said pipe sections forming part of a drill string casing and including opposing end faces and an inside thread on their facing ends, said pipe joint comprising a tubular inside part which has an outside thread on each of its opposite ends wherein the outside threads run in opposite directions of rotation, one of said ends being screwed to the inside thread of the first pipe section and the other of said ends being screwed to the inside thread of the second pipe section, and a tubular outside part including opposite end faces that can move axially over said inside part and which is non-twistably supported on said inside part, so that when the pipe sections are in a joined position, the opposing end faces of the pipe sections are in a compressive engagement with the opposite end faces of the outside part.

7. A pipe joint according to claim 6, wherein the outside part comprises a tool.

8. A pipe joint according to claim 7, wherein said tool comprises a stabilizer.

9. A pipe joint according to claim 7, wherein said tool comprises an eccentric stabilizer.

10. A pipe joint according to claim 7, wherein said tool comprises a wear protection sleeve.

11. A pipe joint according claim 7, wherein said tool comprises an eccentric wear protection sleeve.

12. A method for forming a pipe joint for a first and second pipe section, said pipe sections forming part of a drill string casing and including opposing end faces and an inside thread on their facing ends, said pipe joint comprising a tubular inside part which has an outside thread on each of its opposite ends wherein the outside threads run in the same direction of rotation, and a tubular outside part including opposite end faces that can move axially over said inside part and which is non-twistably supported on said inside part, said method comprising the steps of:

screwing one end of the inside part into the first pipe section;

screwing the other end of the inside part into the second pipe section thereby forming a loose pipe joint; and rotating the inside part and one of the first or second pipe sections while the other of the first or second pipe sections is held generally non-rotatable thereby tightening said pipe joint and bringing the opposing end faces of the first and second pipe sections into a compressive engagement with the opposite end faces of the outside part.

13. The method of claim 12 further including the step of adjusting the inside part with respect to one of the first or second pipe sections while tightening the pipe joint.

14. The method of claim 12 further including the step of adjusting the inside part with respect to both of the first and second pipe sections while tightening the pipe joint.

15. The method of claim 12 further including the step of aligning the outside part with respect to one of the first or second pipe sections while tightening the pipe joint.

16. The method of claim 12 further including the step of aligning the outside part with respect to both of the first and second pipe sections while tightening the pipe joint.

17. A method for forming a pipe joint for a first and second pipe section, said pipe sections forming part of a drill string casing and including opposing end faces and an inside thread on their facing ends, said pipe joint comprising a tubular inside part which has an outside thread on each of its opposite ends wherein the outside threads run in opposite directions of rotation, and a tubular outside part including opposite end faces that can move axially over said inside part and which is non-twistably supported on said inside part, said method comprising the step of:

screwing one end of the inside part into the first pipe section;

screwing the other end of the inside part into the second pipe section thereby forming a loose pipe joint; and rotating the inside part while the first and second pipe sections are held generally non-rotatable thereby tightening said pipe point and bringing the opposing end faces of the first and second pipe sections into a compressive engagement with the opposite end faces of the outside part.

18. The method of claim 17 further including the step of adjusting the inside part with respect to one of the first or second pipe sections while tightening the pipe joint.

19. The method of claim 17 further including the step of adjusting the inside part with respect to both of the first and second pipe sections while tightening the pipe joint.

20. The method of claim 17 further including the step of aligning the outside part with respect to one of the first or second pipe sections while tightening the pipe joint.

21. The method of claim 17 further including the step of aligning the outside part with respect to both of the first and second pipe sections while tightening the pipe joint.

* * * * *